United States Patent
Kerl et al.

(10) Patent No.: US 10,027,559 B1
(45) Date of Patent: Jul. 17, 2018

(54) CUSTOMER DEFINED BANDWIDTH LIMITATIONS IN DISTRIBUTED SYSTEMS

(71) Applicant: AMAZON TECHNOLOGIES, INC., Seattle, WA (US)

(72) Inventors: John Robert Kerl, Reston, VA (US); Yohanes Santoso, Sterling, VA (US); Avichai Mendle Lissack, Herndon, VA (US); Leonid Valentinovich Nikolayev, Fairfax, VA (US); Nolen Clark Royalty, Ann Arbor, MI (US); Kyle Tailor Akers, Sterling, VA (US); Michael Siaosi Voegele, Bethesda, MD (US); Daniel L. McCarriar, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 473 days.

(21) Appl. No.: 14/749,363

(22) Filed: Jun. 24, 2015

(51) Int. Cl.
*H04L 12/24* (2006.01)

(52) U.S. Cl.
CPC ........ *H04L 41/5012* (2013.01); *H04L 41/082* (2013.01); *H04L 41/083* (2013.01)

(58) Field of Classification Search
None
See application file for complete search history.

(56) References Cited

U.S. PATENT DOCUMENTS

| | | |
|---|---|---|
| 7,124,320 B1 | 10/2006 | Wipfel |
| 7,917,469 B2 | 3/2011 | Bernhard et al. |
| 8,160,072 B1 * | 4/2012 | Gnanasekaran .... H04L 47/2441 370/229 |
| 8,276,035 B1 * | 9/2012 | Savarese ............... H04L 1/0007 714/749 |
| 8,385,199 B1 | 2/2013 | Coward et al. |
| 9,674,731 B2 * | 6/2017 | Raleigh ............. H04W 28/0289 |
| 9,749,898 B2 * | 8/2017 | Raleigh ............. H04W 28/0289 |
| 2003/0046396 A1 | 3/2003 | Richter et al. |
| 2007/0056030 A1 | 3/2007 | Kay |

(Continued)

FOREIGN PATENT DOCUMENTS

| | | |
|---|---|---|
| EP | 0817433 A2 | 1/1998 |
| EP | 2629470 A1 | 8/2013 |

(Continued)

*Primary Examiner* — Jeffrey R Swearingen
(74) *Attorney, Agent, or Firm* — Blank Rome LLP

(57) ABSTRACT

A centralized networking configuration in a distributed system includes a plurality of computing devices implementing a networking configuration server and a plurality of nodes of a service provider network. The computing devices are configured to obtain, at the networking configuration server, client input throttling instructions and client billing information, determine, at the networking configuration server, based on the client input throttling instruction and client billing information, to apply a networking configuration option provided by the client input throttling instructions to a particular category of traffic associated with a service instance of a network-accessible service of the service provider network, transmit, from the networking configuration server to a particular node of the provider network, the networking configuration option, and implement, at the particular node, the networking configuration option.

22 Claims, 14 Drawing Sheets

(56) References Cited

U.S. PATENT DOCUMENTS

| | | |
|---|---|---|
| 2008/0008095 A1 | 1/2008 | Gilfix |
| 2009/0219940 A1 | 9/2009 | Jansson |
| 2011/0199932 A1 | 8/2011 | Short et al. |
| 2011/0219102 A1 | 9/2011 | Sankaran |
| 2012/0148247 A1 | 6/2012 | Skubic et al. |
| 2012/0159234 A1 | 6/2012 | Mehta et al. |
| 2012/0250694 A1 | 10/2012 | Hall et al. |
| 2013/0077486 A1 | 3/2013 | Keith |
| 2013/0107707 A1 | 5/2013 | Ramamurthy et al. |
| 2013/0185427 A1 | 7/2013 | Sterling et al. |
| 2013/0227164 A1 | 8/2013 | Kumar et al. |

FOREIGN PATENT DOCUMENTS

| | | |
|---|---|---|
| WO | 2004034731 A1 | 4/2004 |
| WO | 2007047864 A2 | 4/2007 |
| WO | 2009103236 A1 | 8/2009 |

\* cited by examiner

BANDWIDTH LIMITATIONS

THRESHOLD BILLING AMOUNT UNTIL THROTTLING OCCURS = $150 ← 402

THROTTLING OPTIONS: ← 406

| LIST OF INSTANCES | DATA TRANSFER RATE | TYPE OF PACKETS | GEOGRAPHICAL REGION | TYPE OF DATA |
|---|---|---|---|---|
| INSTANCE 1: | 50 Mbit/sec | Received Packets | All Regions | Internet |
| INSTANCE 2: | 0 Mbit/sec | All Packets | US East | All |
| INSTANCE 3: | No Throttling | | | |
| INSTANCE 4: | 100 Mbit/sec | Transmitted Packets | All Regions | EC2 to EC2 |

FIG. 4

CUSTOMER DEFINED BANDWIDTH LIMITATIONS IN DISTRIBUTED SYSTEMS

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties. These network communications require the transfer of data between components in the network and/or to the external entities. A customer's account may be billed, at least in part, based on the amount of this data that is transferred during a billing cycle. Because a data transfer may vary from billing cycle to billing cycle, it may be difficult for a customer to estimate a bill for a particular billing cycle.

BRIEF DESCRIPTION OF THE DRAWINGS

For a detailed description of various examples, reference will now be made to the accompanying drawings in which:

FIG. 4 shows an example dialog that displays and allows entry of client input throttling instructions that a billing node may obtain from a client, in accordance with various embodiments;

DETAILED DESCRIPTION

Figure 1:
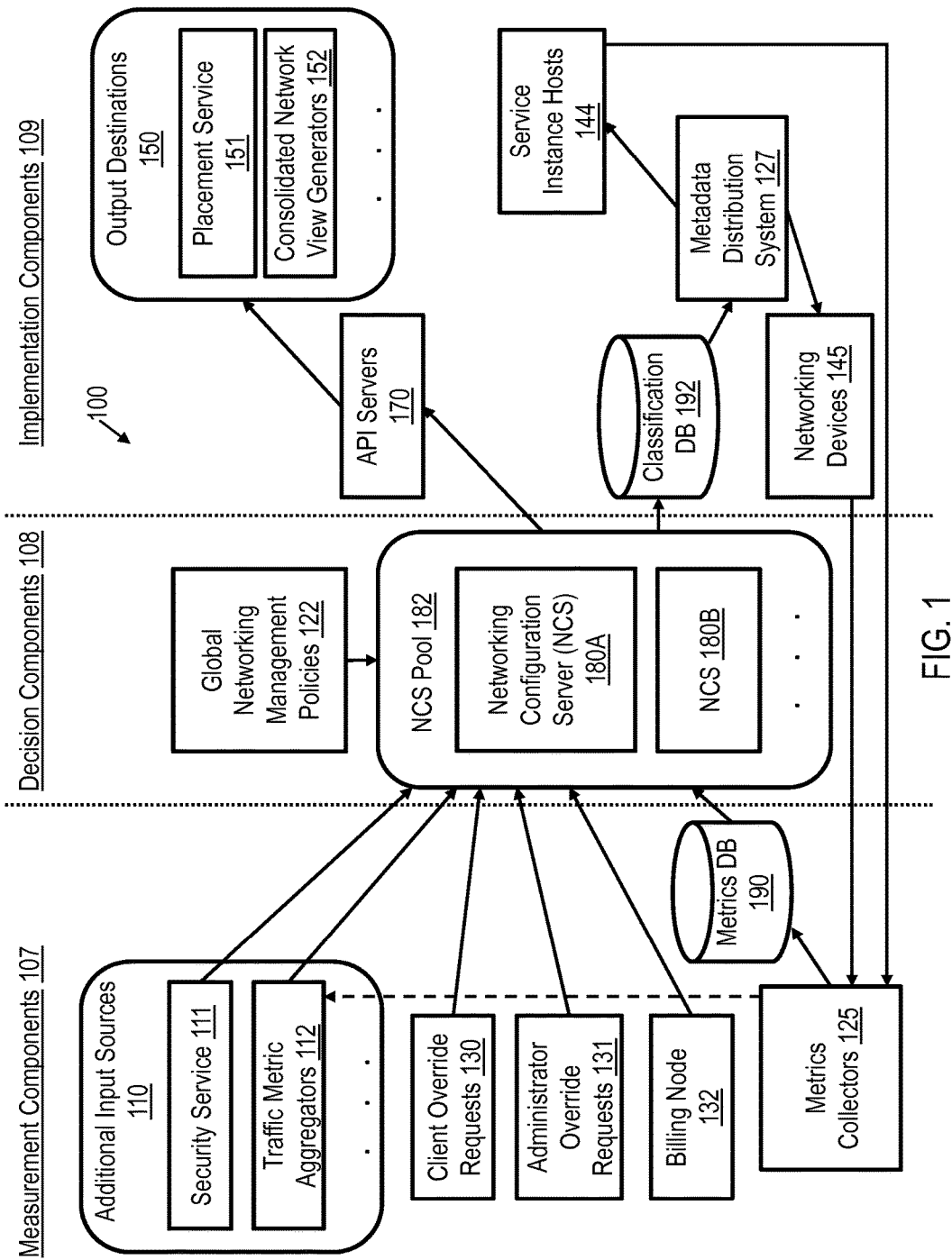
FIG. 1 shows a block diagram of a system in which a centralized networking configuration service is implemented to manage network traffic at a plurality of nodes of a distributed computing environment, in accordance with various embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

In large-scale distributed systems, a client's account may be billed based on the amount of data that is transferred during a billing cycle in addition to other metrics, e.g., a flat rate for the number of resources that the client wishes to consume during a billing cycle. Because a client may transfer more data during a billing cycle than expected, the client may receive a bill larger than anticipated for the billing cycle. Therefore, it is desirable to allow the client to define bandwidth limits that automatically limit the amount of data transferred during a billing cycle. For example, the system may allow a client to set a threshold amount or level that, once the accrued account balance for a given billing cycle has been exceeded, automatically causes the system to throttle data transfers. In this way, a client is able to estimate upfront what an account will be charged during the given billing cycle because the client is able to limit the amount of data transferred.

Various embodiments of methods and apparatus for configuring networking operations in a large-scale distributed system based on customer defined bandwidth limitations are described. In some embodiments, a centralized networking configuration management scheme may be implemented, according to the customer defined bandwidth limitations which may be implemented by one or more networking configuration servers (NCSs). In some embodiments, networking configuration servers may also be referred to as "bandwidth arbitration servers," as the servers' primary responsibility may be to manage bandwidth usage at components of a distributed system via the imposition of respective bandwidth limits for various traffic categories. Metadata may be used to implement the decisions, including for example traffic classification procedures or rules and networking configuration options for various categories of traffic. The metadata may be transmitted in a portable, easy-to-parse format from the NCSs to the nodes of the distributed system. At the nodes of the distributed system, the received metadata may be interpreted, for example, by networking management modules within virtualization management software, to classify packets or other units of network traffic schedule as they are generated or received, and to apply the decisions made at the NCSs to schedule and/or throttle transmissions of the traffic. The responsibility of generating the logic to be used for traffic throttling scheme thus may be handled by the centralized networking configuration servers, and the logic may be applied at the various nodes by relatively simple control modules.

The networking configuration management techniques may include support for programmatic interfaces that enable clients of the distributed systems to obtain unified or consolidate views of the networking-related status of resources of interest in some embodiments. Programmatic interfaces may also be implemented in at least some embodiments to enable clients to submit client input throttling instructions which provide a threshold billing level or amount that indicates that, during a billing cycle, once an accrued bill has exceeded the threshold level, the client requires throttling of data transfers. The client input throttling instructions also provide instructions to the NCSs as to the specific networking configuration option that the client wishes to be implemented when the threshold level is exceeded. Because a client's account may be billed based on the amount of data that is transferred during a billing cycle, the client is able to estimate upfront what an account will be charged during the given billing cycle because the client may control the amount of data transferred. In at least some implementations, part or all of the networking configuration scheme may be implemented as a web service, e.g., one or more web service programmatic interfaces may be supported for various types of interactions with the networking configuration servers.

In much of the following description, a provider network is used as an example of a distributed system in which the centralized networking configuration techniques may be implemented. Networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the bandwidth management techniques described herein may be implemented, those techniques may also be applied to other types of distributed systems than provider networks, e.g., to large-scale distributed application environments in which different components of the applications may have time-varying bandwidth needs.

Figure 2:
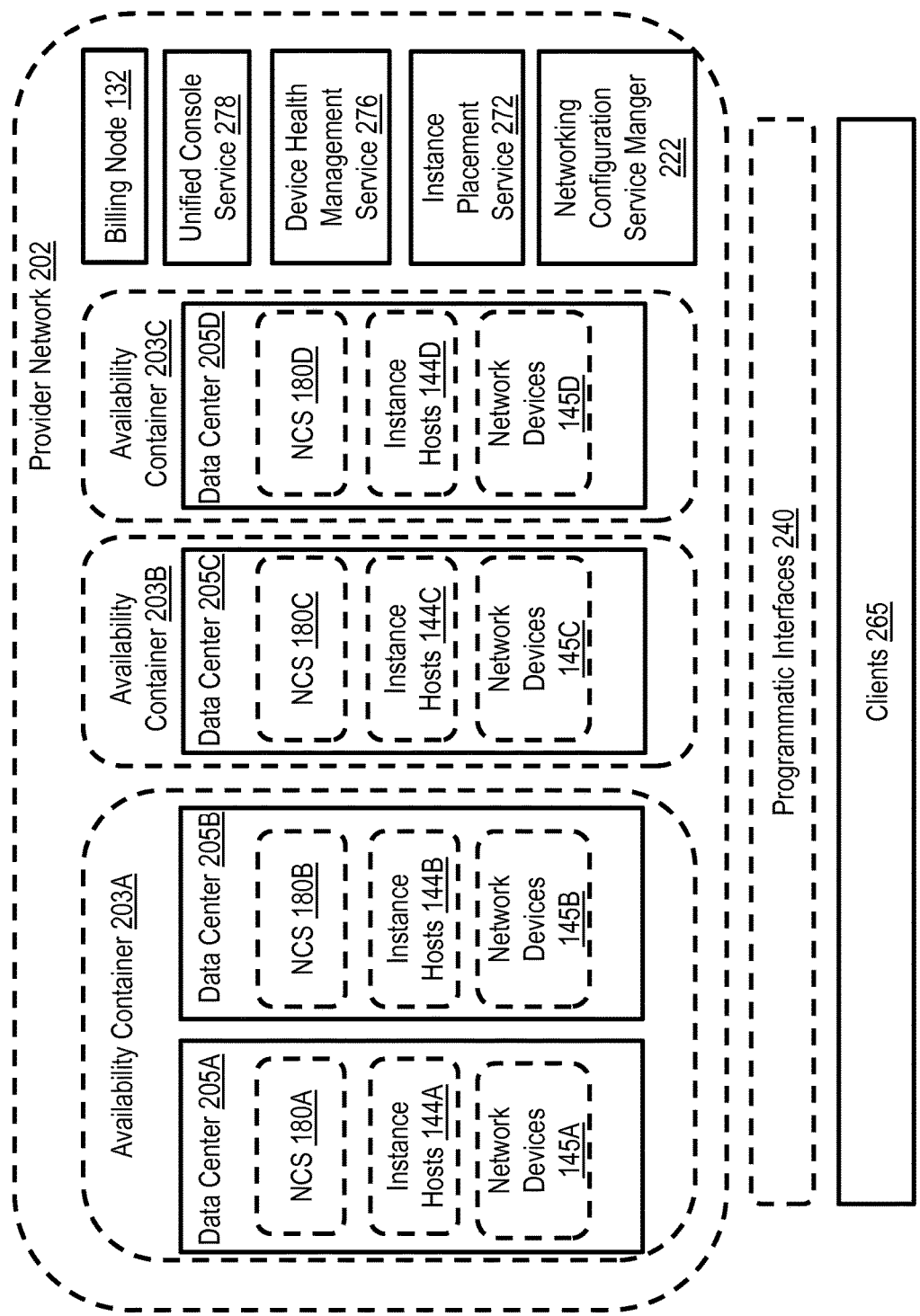
FIG. 2 shows an example of a provider network environment in which respective networking configuration servers are established in each of several availability containers, in accordance with various embodiments.

FIG. 1 shows a block diagram of a system 100 in which a centralized networking configuration service is implemented to manage network traffic at a plurality of nodes of a distributed computing environment, in accordance with various embodiments. As shown, a pool 182 of networking configuration servers 180 such as NCS 180A and NCS 180B may be established. In some embodiments, the NCSs 180 may be distributed among various data centers of the computing environment, as illustrated in FIG. 2 and described below. A given NCS 180 may, for example, comprise one or more software and/or hardware modules in different embodiments, and may itself be implemented using a plurality of computing devices in some cases. The NCSs 180 may be configured to receive inputs from several different types of sources. Customizable traffic classification logic and networking configuration options such as bandwidth limits, i.e., throttling, to be applied at various elements of the distributed computing environment may be determined by the NCSs 180 on the basis of the inputs and/or in view of global networking management policies 122. From the perspective of the networking configuration service 180, the elements of the distributed computing environment may be classified into three high-level categories: measurement-related components 107, decision components 108, and implementation components 109. The measurement-related components 107 may comprise various input sources for the NCSs 180; the decision components 108 may comprise the NCSs 180 themselves; and the implementation components 109 may represent entities at which the decisions are executed to shape network traffic, or where output generated by the decision components is utilized for other purposes.

A number of types of networking-related metrics may be gathered from instance hosts 144 and/or networking devices 145, for example by metrics collectors 125, and placed in a metrics database 190 accessible by the NCSs 180. For example, such metrics may include the incoming and outgoing network traffic rates at a given host during a time interval (e.g., expressed in bytes or in packets), the number of network connections corresponding to various protocols such as Transmission Control Protocol (TCP) or User Datagram Protocol (UDP), the number of packets dropped during a time interval and the causes of the packet drops, the number of packets whose transmission was delayed due to enforcement of current bandwidth limits, the distributions of the sizes of the packets, the applications on whose behalf the traffic occurred to or from a given node, the clients on whose behalf the traffic was initiated, latencies associated with packet delivery, and/or the IP addresses of the endpoints involved in various transmissions. In addition to the metrics stored in database 190, the NCSs 180 may also receive input from additional input data sources 110 of system 100, such as security service 111 or traffic metric aggregators 112. A security service 111 may be configured to monitor traffic patterns at various parts of the system 100 to detect network intrusions or attacks (some of which may originate outside the system 100, e.g., from various locations on the public Internet, while others may originate at some of the instance hosts 144 themselves). When a suspicious traffic pattern is detected, e.g., if there is a sudden and sustained burst of high traffic directed to a given network address, the security service 111 may inform the NCSs 180, which may take mitigating actions. For example, the NCSs 180 may generate new traffic categories and corresponding bandwidth limits to be applied, or alter the bandwidth limits of existing categories, and transmit the newly-modified or generated classification metadata to the appropriate hosts to limit the impact of the potential security event. Traffic metric aggregators 112 may combine metrics transmitted from the collectors 125 into buckets, e.g., per-IP-address buckets or per-client buckets, and representations of the buckets may be made available to the NCSs 180, to be considered when making networking configuration decisions.

In an embodiment, billing node 132 also may play a role in the decisions made by the NCSs 180. NCSs 180 may obtain billing information and client input throttling instructions from a client. In some embodiments, NCSs 180 may obtain this billing information after being pushed by billing node 132 periodically, e.g., every second, minute, hour, day, week, etc. In alternative embodiments, NCSs 180 may periodically, transmit a request to billing node 132 for the billing information. Billing node 132 may then respond to the request and transmit the billing information to NCSs 180. Billing information may include a current account balance. The current account balance may include the client's balance that has accrued thus far during the current billing cycle. For example, a client may be billed monthly, quarterly, yearly, etc. The billing information provided to the NCSs 180 may indicate that the current balance has reached, for example, $89 during the current billing cycle. The billing information then may be updated as the billing information calculated by the billing node 132 updates throughout the billing cycle. This calculation may be in accordance with the terms of service the client has previously agreed, e.g., the amount of data transferred (in bits) during the current billing cycle times the amount charged per bit of data transferred. In alternative embodiments, the billing information may include an amount of network traffic (e.g., number of bytes) incurred on the client's behalf during the current billing cycle, e.g., the amount data transferred during the billing cycle.

Client input throttling instructions may include instructions from a client imposing various bandwidth limits, e.g., throttles, for a given category of traffic that NCSs 180 may impose on various instances controlled by the client. The client input throttling instructions also may include a threshold level or amount that, when exceeded, the client requires the imposition of bandwidth limits. For example, the client may require data transfer limits to be imposed once a current billing cycle reaches $150. In this embodiment, the client input throttling instructions will contain a threshold amount of $150. Once the billing information indicates that the threshold amount has been exceeded for a given billing cycle, bandwidth limits will begin to be imposed by NCSs 180. In some embodiments, the bandwidth limits are removed once a new billing cycle begins. By controlling the amount of data transferred and implementing bandwidth limits, clients are able to control costs and effectively estimate upfront what an account will be charged for data transfer in a given billing cycle even if the client is charged based on the amount of data transferred during the billing cycle.

Client override requests 130 and/or administrator override requests 131 may also play a role in the decisions made by the NCSs 180. For example, based on the global policies 122 and other metrics, including the billing information and client input throttling instructions obtained from billing node 132, a NCS 180 may determine that the bandwidth limit for a given category of traffic at an instance host 144 is to be set to 2 Mbit/sec for the next time interval being considered. However, a client whose compute instance happens to be instantiated at that instance host 144 may submit a request for 5 Mbit/sec bandwidth for that compute instance, or an administrator of a service being implemented at that instance host may submit a request to limit the bandwidth to 1 Mbit/sec, and such requests may be used by the NCSs 180 to override other factors in the depicted embodiment. In another example, a client may require additional bandwidth during the current billing cycle than typical. For instance, the client may pay for 100 Gbit of data transfer per billing cycle. Therefore, bandwidth may begin to be throttled, based on the information provided in the client input throttling instructions, once the 100 Gbit have been used. Should the client require more bandwidth than what the client has been throttled to after utilizing 100 Gbit during the current billing cycle, the client may utilize a client override request 130 to ease the bandwidth limit.

According to some embodiments, a given NCS 180 may generate traffic classification metadata for one or more instance hosts 144 and/or network devices 145 to which the NCS 180 has been assigned. In at least some embodiments, classification metadata may be generated for storage devices as well, such as for network-attached storage (NAS) devices. The metadata may comprise a hierarchy of one or more levels of traffic categories, which may be represented as a tree data structure, for example, in which each node of the tree represents a respective traffic category and has an associated set of networking configuration options or settings (such as bandwidth limits or latency requirements). In at least some embodiments, the classification metadata may be stored in a classification database 192, in addition to being distributed to the appropriate instance hosts 144 and/or network devices 145.

Figure 5:
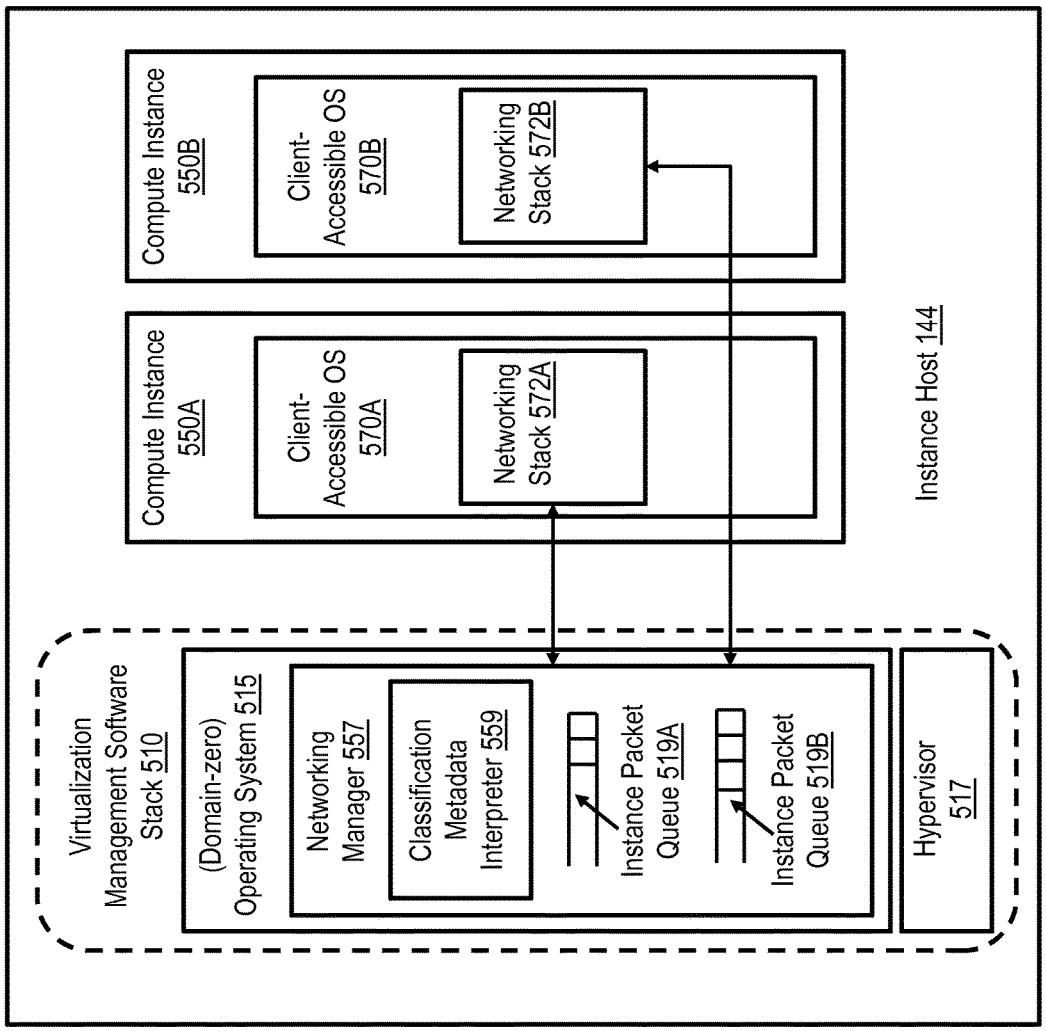
FIG. 5 shows an example of a networking manager module capable of interpreting traffic classification metadata at an instance host of a virtualized computing service, in accordance with various embodiments.

According to some embodiments, the metadata generated at the NCSs 180 may be transmitted to their intended destinations via distribution system 127. Distribution system 127 may itself comprise a plurality of intermediary nodes in some implementations, which may also be used for distributing other types of metadata to various nodes of the system 100, such as routing information and/or access control lists. In embodiments in which database 192 is used as a repository of generated metadata, nodes of the distribution system 127, for example, may be notified (e.g., by subscribing to a notification mechanism) when the database 192 is updated, and may transfer the new metadata to the appropriate destinations accordingly. In some embodiments, portable representations of the metadata (e.g., the classification trees and procedures) may be generated, either by the NCSs themselves or by the distribution system 127, using protocols such as JSON, XML, YAML or proprietary techniques or languages. In one implementation, the portable representations may be stored in database 192. At the destinations, the received metadata representations may be parsed, e.g., by networking management modules of virtualization management software stacks in the case of instance hosts 144, as illustrated in FIG. 5 and described in further detail below.

In one embodiment, one or more application programming interface (API) servers 170 may be set up to handle requests directed at the NCSs 180 from other output destinations 150 of the implementation subsystem 109. For example, one or more servers may be configured as consolidated network view generators 152, to provide clients with a unified view of the networking status of selected portions of the distributed environment. In one implementation, for example, clients may be assigned hundreds or thousands of service instances at various instance hosts, and may be able to view various types of metrics (such as recent incoming/outgoing traffic rates, dropped packet rates, applicable bandwidth limits and the like) for their instances via a console implemented by the view generators 152. In at least one embodiment, a placement service 151 also may be able to access network bandwidth limits and other metrics from the NCSs via the API servers 170, which may be helpful in making decisions regarding the instance hosts to be used for new service instances that are to be launched, or in moving existing service instances to instance hosts with less bandwidth contention.

FIG. 2 shows an example of a provider network environment in which respective networking configuration servers are established in each of several availability containers, according to at least some embodiments. As shown, provider network 202 may comprise several availability containers 203, such as 203A, 203B and 203C in the depicted embodiment. Each availability container in turn may comprise one or more data centers 205, such as data centers 205A and 205B in availability container 203A, data center 205C in availability container 203B, and data center 205D in availability container 203C. Each availability container 203 may be designed and engineered in such a way (e.g., with respective independent infrastructure elements such as electrical power sources, and with some geographical distance between different availability containers) that the effects of various types of failure events in any given availability container may typically be limited to that availability container. Hence, failures and/or errors may typically not spread across availability container boundaries, and the different availability containers may be deemed to have independent failure profiles or independent availability profiles. Even if a given availability container suffers a natural disaster, for example, other availability containers may be expected to remain operational.

In keeping with the design goal of avoiding or reducing cross-availability-container dependencies, at least one NCS 180 may be established in each availability container 203 in the depicted embodiment. For example, NCSs 180A and 180B are set up respectively in data centers 205A and 205B of availability container 203A, NCS 180C is established in data center 205C of availability container 203B, and NCS 180D is located in data center 205D of availability container 203C. NCS 180A may be configured to generate classification metadata for instance hosts 144A of one or more network-accessible services (such as a virtualized computing service or a storage service) being implemented at data center 205A, and for network devices 145A located in data center 205A. Similarly, NCS 180B may be assigned the task of generating classification metadata for instance hosts 144B and network devices 145B, NCS 180C may be responsible for generating classification metadata for instance hosts 144C and network devices 145C, and NCS 180D may be configured for generating classification metadata for instance hosts 144D and network devices 145D. Although a single NCS is shown in each data center 205 in the embodiment illustrated in FIG. 2, a plurality of NCSs may be set up in a given data center 205 (depending on, for example, performance requirements and/or on the number of nodes for which metadata has to be generated at the data center) in at least some embodiments. In one embodiment, if an availability container (such as 203A) comprises N data centers, and the performance requirements for bandwidth management can be met by fewer than N NCSs, some data centers need not have any NCSs configured—instead, a single NCS may suffice for more than one data center. In other embodiments, a given NCS 180 may be configured to generate metadata for nodes at more than one availability container.

The number and placement of the NCSs 180 may be determined by a networking configuration service manager 222 in the depicted embodiment. The NCS manager 222 may itself comprise a plurality of hardware and/or software components in some implementations, some of which may be distributed across the data centers 205 of various availability zones 203. Configuration changes for the NCSs 180 may be initiated by the NCS manager as needed in the depicted embodiment—e.g., when a new version of a software module used by NCSs is to be deployed, the deployments may be orchestrated by the NCS manager.

A number of other services of the provider network may interact with the networking configuration system in the depicted embodiment. For example, a unified console service 278 may implement one or more programmatic interfaces 240 (such as web pages, APIs, GUIs, and/or command-line tools) enabling clients 265 to submit queries regarding networking status, including bandwidth limits, of resources of interest and to receive the requested information programmatically. The unified console service 278 may represent one example of a consolidated network view generator 152 of FIG. 1. Programmatic interfaces 240 also may enable clients to submit the client input throttling instructions to the provider network 202 through billing node 132—e.g., to lower applicable bandwidth limits on various service instances or instance hosts for specified time periods.

A device health management service 276 may be implemented at the provider network 202, to collect (e.g., using a heartbeat mechanism) responsiveness information from various instance hosts and network devices in some embodiments. In the depicted embodiment, the health management service 276 also may be used for the collection of networking-related metrics to be used as input by the NCSs 180, e.g., by piggybacking networking metrics on health status messages. Thus, nodes of the health management service 276 may be considered examples of metrics collectors 125 illustrated in FIG. 1. The health management service also may be used as a metadata distribution system 127 in some embodiments—e.g., heartbeat messages sent to various instance hosts may include piggybacked classification metadata. An instance placement service 272 may obtain the latest available networking-related metrics and configuration settings from the NCSs 180 to select instance hosts with sufficient spare bandwidth available for launching new instances, or to select instance hosts to which existing instance should be moved in view of changing network traffic conditions.

Figure 3:
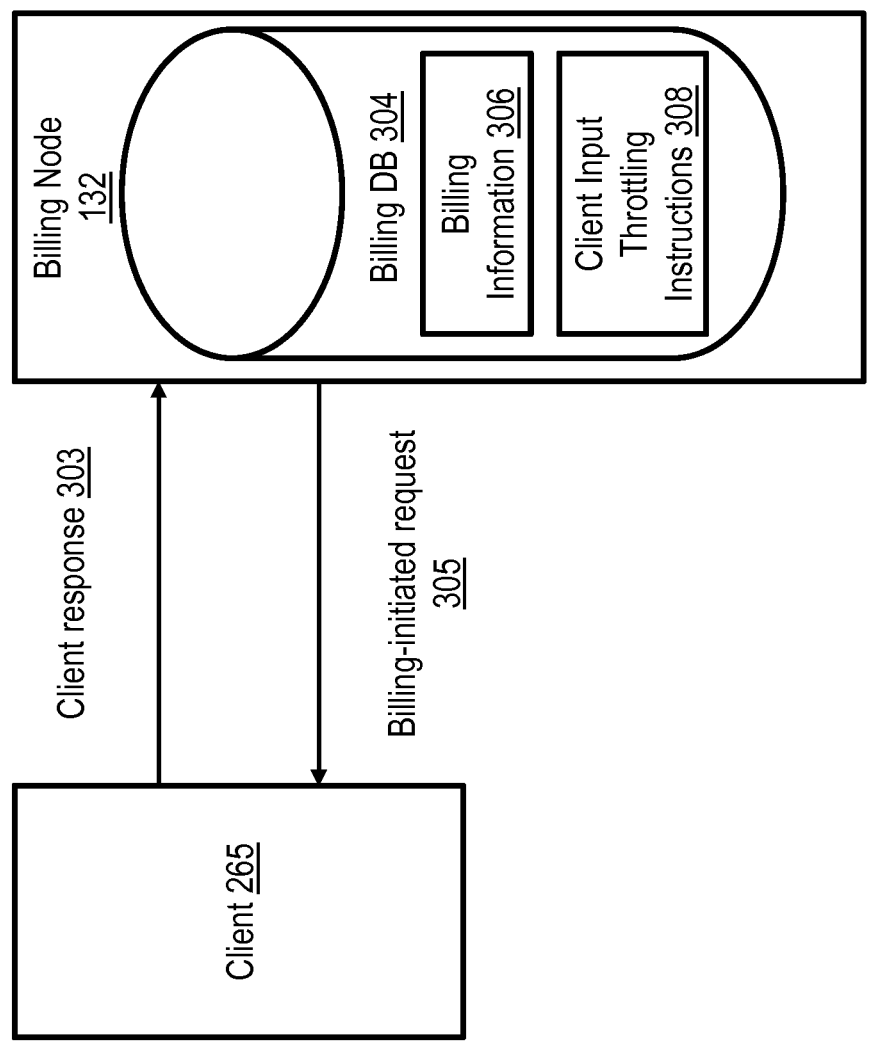
FIG. 3 shows an example of a billing node and its communication with a client in which client input throttling instructions are communicated and billing information is stored, in accordance with various embodiments.

FIG. 3 shows an example of a billing node 132 and its communication with a client 265 in which client input throttling instructions are communicated and billing information is stored, according to at least some embodiments. Client 265 may be any computing device, process, hardware module or software module that are owned by, managed by, or allocated to, an entity (such as an organization, a group with multiple users or a single user) that is capable of accessing and utilizing at least one network-accessible service of the provider network 202. Billing node 132 may comprise billing database 304 and may be configured to obtain client input throttling instructions 308 and determine, e.g., calculate, billing information 306. Billing node 132 may be any computing device, process, hardware module or software module that may capture usage records of clients of provider network 202, e.g., network traffic measurement data such as the amount of data transferred during a billing cycle on behalf of client 265, and bill the client for that usage each billing cycle. These usage records may comprise at least a part of the billing information 306. In some embodiments, billing node 132 also may determine, in conjunction with client 265, the length and/or start/stop of the billing cycle (e.g., monthly, quarterly, yearly, etc.).

During each billing cycle, billing node 132 may determine, e.g., compute, the current billing cycle amount. This account balance may also comprise at least a part of the billing information 306. The current billing cycle amount may be continuously updated throughout the billing cycle, e.g., each hour, each day, each week, etc. The account balance may be based on different variables. For example, client 265 may be billed a flat rate for the use of various resources of provider network 202. Additionally, client 265 may be billed for the amount of data transferred utilizing provider network 202 during each billing cycle. In yet another embodiment, client 265 may be billed a flat rate for the use of a set amount of data transferred utilizing provider network 202 during each billing cycle and then an additional amount for any data transfer above the set amount. Data transfers to different types of services may incur different rates. For example, data transfers within provider network 202 utilizing client 265 instances, e.g., instance-to-instance data transfers, may incur a billing charge at a different rate than data transfers from instances within provider network 202 to the internet. Similarly, data transfers from one instance to another instance within a geographical region may incur a billing charge at a different rate than data transfers from one geographical region to another. Each of these types of data transfers may make up a different category of traffic that may be bandwidth-limited by NSC 180.

Client input throttling instructions 308 include instructions obtained from client 265 that contain rules for limiting bandwidth, e.g., limiting specific types of data transfers. These rules for limiting bandwidth may comprise a networking configuration option and a threshold account balance that NSC 180 obtains from client 265 to limit bandwidth in accordance with the rules on behalf of the client. The threshold account balance is the amount that, when exceeded during the current billing cycle, causes NSCs 180 to implement a networking configuration option also disclosed in the client input throttling instructions 308. The networking configuration option is the, networking configuration that the client wishes to enact once the threshold account balance is exceeded in a given billing cycle. For example, the networking configuration option may provide bandwidth limits for a client's particular instances. The networking configuration option is discussed in more detail below in FIG. 4.

In some embodiments, the billing node 132 transmits billing-initiated request 305 to client 265. Billing-initiated request 305 may request that client 265 provide client input throttling instructions 308 to billing node 132. In response to the billing-initiated request 305, client 265 may transmit client response 303 providing client input throttling instructions 308 to billing node 132. In alternative embodiments, client 265 pushes client input throttling instructions 308 to billing node 132 without first receiving a billing-initiated request 305.

NSCs 180 obtain both the billing information 306 and the client input throttling instructions 308 from billing node 132. NSCs 180 then may determine, by comparing the current cycle account balance to the threshold amount contained in the client input throttling instructions 308, whether to implement the networking configuration option disclosed in the client input throttling instructions 308. If NSCs 180 determine that the current cycle account balance has exceeded the threshold amount for the current billing cycle, then the NSCs 180 will implement the networking configuration option disclosed in the client input throttling instructions 308. Thus, the bandwidth limits, e.g., data transfer throttling or a reduction in data transmission rate, will be implemented by the NSCs 180 in accordance with the client throttling instructions 308. However, if NSCs 180 determine that the current cycle account balance has not exceeded the threshold amount for the current billing cycle, then the NSCs 180 will not limit bandwidth per the client input throttling instructions 308. In some embodiments, once the networking configuration option has been implemented, a notice may be transmitted from billing node 132 to client 265 notifying client 265 that the networking configuration option has been implemented. In some embodiments, the notice may take the form of an email, a text message, a voice message, etc.

In an embodiment, NSCs 180 may receive an override request from client override requests 130. If a client override request is received, then NSCs 180 may override any bandwidth limits previously implemented. In other words, NSCs 180 may cancel the networking configuration option disclosed in the client input throttling instructions 308 based on the NSC 180 receiving an override request.

FIG. 4 shows an example dialog 401 that displays and allows entry of client input throttling instructions that the billing node 132 may obtain from client 265, according to at least some embodiments. Dialog 401 may be displayed at client 265 such that a user of client 265 may input the client input throttling instructions 208. The dialog 401 may be rendered as a web page displayed on client 265 where the content of the dialog 401 may be transferred to billing node 132.

In the dialog 401, field 402 shows the threshold account balance when throttling occurs, i.e., the current cycle account balance that, when exceeded during the current billing cycle, will implement the networking configuration option disclosed in the remaining fields of dialog 401. In this example, the threshold account balance is $150. In some embodiments, this amount may be entered by a user of client 265 by typing the amount into the field 402, may be selected by the user from a drop down menu, or user may make the selection via checking a click box. Thus, after the account balance, as calculated by billing node 132, exceeds $150 during the current billing cycle, the NSCs 180 will implement the networking configuration option disclosed in the client input throttling instructions 208 as input in dialog 401.

Fields 404-412 include the networking configuration option that is implemented once a determination by the NSCs 180 that the threshold account balance has been exceeded during the current billing cycle. As shown in fields 404-412, the networking configuration option may specify a reduction of a data transmission rate for each of a plurality of different network traffic categories. For example, the networking configuration option may be implemented on an instance by instance basis. Therefore, in field 404, each of the instances that client 265 operates in provider network 202 may be listed. Fields 406-412 include specific traffic categories that client 265 may limit once the threshold amount is exceeded. In field 406, the bandwidth limitations may be listed. For example, a user of client 265 may enter what level of bandwidth limitation the user wishes to implement once the threshold account balance has been exceeded in a billing cycle. This bandwidth limitation may be in the form of a limitation or reduction on the data transfer rate of each instance. In field 408, the type of packets that the user wishes to limit bandwidth may be input, e.g., throttling only received packets, throttling only transmitted packets, or throttling all data packet transfers. In field 410, the geographical region that the user wishes to limit bandwidth may be input, e.g., throttling data transfers to all regions or throttling data transfers only to specific regions that the data may be transferred from or to. In field 412, the type of data that the user wishes to limit bandwidth may be input, e.g., all types of data, data transferred from or to the internet, or data transferred from or to different instances within the provider network 202.

In the example shown in FIG. 4, the user of client 265 has elected to limit data transfers for Instance 1 on only received packets from all regions over the internet to 50 Mbit/sec once the throttling amount of $150 has been exceeded during the billing cycle. However, Instance 1 will not have any other bandwidth limits for any other transfer. Similarly, Instance 2 will limit all types of data transferred from or to Instance 2 from the geographical region of U.S. East to 0 Mbit/sec once the throttling amount of $150 has been exceeded during the billing cycle. In other words, no data transfers will be allowed for any type of data transferred to or from the U.S. East geographical region for Instance 2. For Instance 3, the user has designated in client 265 there will be no bandwidth limitations on any data transfers even after the threshold amount has been exceeded. For Instance 4, client 265 has elected to limit data transfers on only transmitted packets to other instances, e.g., other EC2 instances such as Instance 1, in any region to 100 Mbit/sec. In alternative embodiments, an option may exist for the user of client 265 to select a single option limiting all data transfers once the threshold amount has been reached. In this embodiment, no data is allowed to transfer once the threshold amount is reached. Therefore, a client's bill will not increase due to data charges above the threshold amount.

The information contained in fields 402-412 is then obtained by billing node 132 as the client input throttling instructions 308. NSCs 180 then obtain both the client input throttling instructions 308 and the billing information 306 so as to implement the networking configuration option contained in the client input throttling instructions 308 through traffic classification metadata once the threshold amount is exceeded.

As described above, networking configuration servers may transmit representations of traffic classification metadata to instance hosts of various network-accessible services in different embodiments. FIG. 5 shows an example of a networking manager module capable of interpreting traffic classification metadata at an instance host 144 of a virtualized computing service, according to at least some embodiments. The instance host 144 may include a virtualization management software stack (VMSS) 510 capable of instantiating and managing a number of different client-accessible virtual machines or compute instances 550, such as compute instances 550A and 550B. The VMSS 510 may comprise, for example, a hypervisor 517 and an administrative instance of an operating system 515, which may be termed a "domain-zero" or "dom0" operating system in some implementations. The dom0 operating system may not be accessible by clients on whose behalf the compute instances 550 run, but may instead be responsible for various administrative or control-plane operations of the virtualized operating system, including handling the network traffic directed to or from the compute instances 550.

In the depicted embodiment, the dom0 operating system 515 may include a variety of control modules including a networking manager component 557 that in turn comprises a classification metadata interpreter module 559. The networking manager component may receive the classification metadata generated by an NCS 180 for instance host 144, for example, including the representations of a classification tree and/or a classification procedure. The interpreter 559 may parse the metadata and apply the procedure indicated in the metadata to packets of traffic directed to or from the various compute instances 550. For example, in order to implement bandwidth limits for various traffic categories, one or more instance packet queues (IPQs) 519 (e.g., IPQs 519A and 519B) may be configured. If the incoming or outgoing traffic rate of a particular category at a particular instance 550 exceeds the bandwidth limit for that category during a given time interval, some of the incoming or outgoing packets may be queued in an IPQ 519 for that particular instance. In some implementations, more than one packet queue may be instantiated for a given compute instance, e.g., one packet queue per traffic category may be set up. In other implementations, a single packet queue may suffice for queuing packets associated with multiple instances 350. IPQs or other similar constructs may also be used to implement other networking configuration options in accordance with metadata received from NCSs in various embodiments, such as latency requirements, other quality-of-service goals (e.g., relative priorities of network transmissions for different traffic categories), packet fragmentation settings, or settings dependent upon packet size.

For example, once a networking configuration option disclosed in client input throttling instructions 308 has been implemented, a reduction in the data transfer rate for instance 550 may be implemented. If the incoming or outgoing traffic rate of a particular category of data exceeds the bandwidth limit for that category, then the incoming or outgoing packets may be queued in IPQ 519. The data stored in the IPQ 519 is then transferred to or from instance 550 at a reduced data transfer rate in accordance with the networking configuration option. Because IPQ 519 may have a finite amount of storage, one or more data packets stored in IPQ 519 may drop out of IPQ 519 once the size limitation of IPQ 519 has been exceeded. In this way, a reduction in data transfer in accordance with the networking configuration option may be implemented.

As shown, each compute instance 550 may comprise a corresponding client-accessible operating system 570 in the depicted embodiment, such as OS 570A of compute instance 550A and OS 370B of compute instance 550B. The operating systems 570 may each comprise their own networking stacks 572 (e.g., networking stack 572A of instance 550A and networking stack 572B of instance 550B), which may communicate with the networking manager 357 to use the hardware network interfaces of the instance host 144 for incoming and outgoing traffic. From the perspective of the clients on whose behalf the compute instances 550 are implemented, each instance may appear to be a fully functional server, and the clients may not be aware of the details of the implementation of the networking configuration techniques being used (such as the queuing of packets at the IPQs). It is noted that techniques for interpreting and using classification metadata similar to those illustrated in FIG. 5 may be used for instance hosts of other types of network-accessible virtualization services as well in different embodiments, such as various types of storage services or database services. It is also noted that in some embodiments, the classification metadata may be interpreted and/or used at least in part at the networking stacks 572 of the instances 550, instead of or in addition to at networking manager 557 of VMSS 510.

Figure 6A:
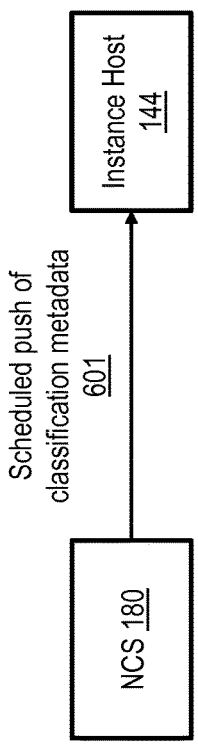
FIG. 6a-c show respective examples of protocols that may be used to transmit traffic classification metadata to an instance host, according to various embodiments.
Figure 6B:
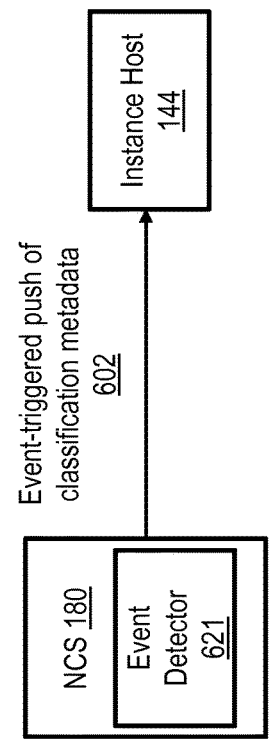
Figure 6C:
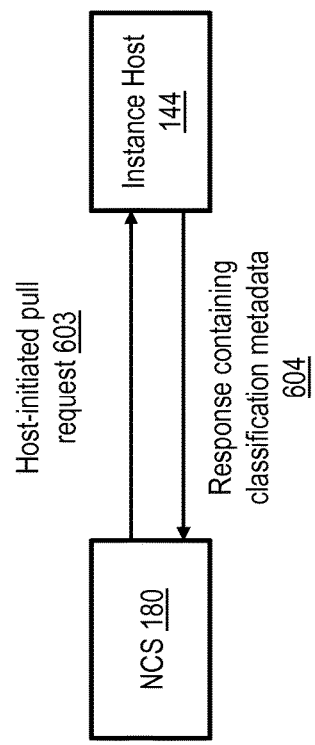

Representations of the metadata generated by the NCSs 180 may be provided to targets such as instance hosts 144 or networking devices 145 in accordance with different protocols or transfer modes in different embodiments. FIG. 6a-6c illustrate respective examples of protocols that may be used to transmit traffic classification metadata to an instance host, according to at least some embodiments. One or more programmatic interfaces may be used to provide the metadata to instance hosts or to other nodes of a distributed system in different embodiments, with either the NCS 180 or the receiver of the metadata invoking the interfaces in accordance with the protocol being used.

In the embodiment shown in FIG. 6a, classification metadata may be sent to instance hosts 144 (or to network devices 145 or storage devices) via scheduled "push" operations 601 initiated by the NCS 180. For example, each NCS 180 may be configured with a respective schedule according to which the NCS 180 is to send metadata to a given metadata target (e.g., once every minute, or once every five minutes). The actual times at which the metadata is sent in some implementations to different targets from a given NCS may be staggered to avoid network congestion caused by the metadata transfer itself. For example, if the metadata is to be pushed once every minute to six instance hosts from a given NCS, the metadata transmission to each of the instance hosts may be scheduled ten seconds apart.

In the embodiment shown in FIG. 6b, triggering events may lead to metadata being transmitted. For example, an event detector 621, which in some embodiments resides within NCS 180, may determine that the account balance for a current billing cycle stored in billing information 306 has exceeded the threshold amount stored in client input throttling instructions 308. Once the event detector 621 makes this determination, it may notify the NCS 180 that this event has occurred, and the NCS 180 may then generate appropriate metadata to implement the networking configuration option. In some embodiments, the triggered push 602 of the generated metadata may be initiated at a high priority as soon as the metadata is generated in some embodiments, in an attempt to respond as quickly as possible to the event. For other types of triggering events, e.g., if an client submits a request to override previously-generated metadata, the metadata need not be pushed immediately or at a high priority.

In the embodiment depicted in FIG. 6c, the instance host 144 may submit a pull request 603 to the BA 180 for the most recent classification metadata, and the metadata may accordingly be sent to the instance host in the response 604. In various embodiments, combinations of any of the three approaches illustrated in FIG. 6a-6c may be used, either for instance hosts 144, for network devices 145, or for storage devices. In at least one embodiment, a differential approach may be used when transmitting metadata—that is, a representation of only the differences between the current metadata and the most-recently provided metadata may be sent to an instance host, network device or storage device. In other embodiments, the entire metadata may be transmitted in each transfer.

Figure 7:
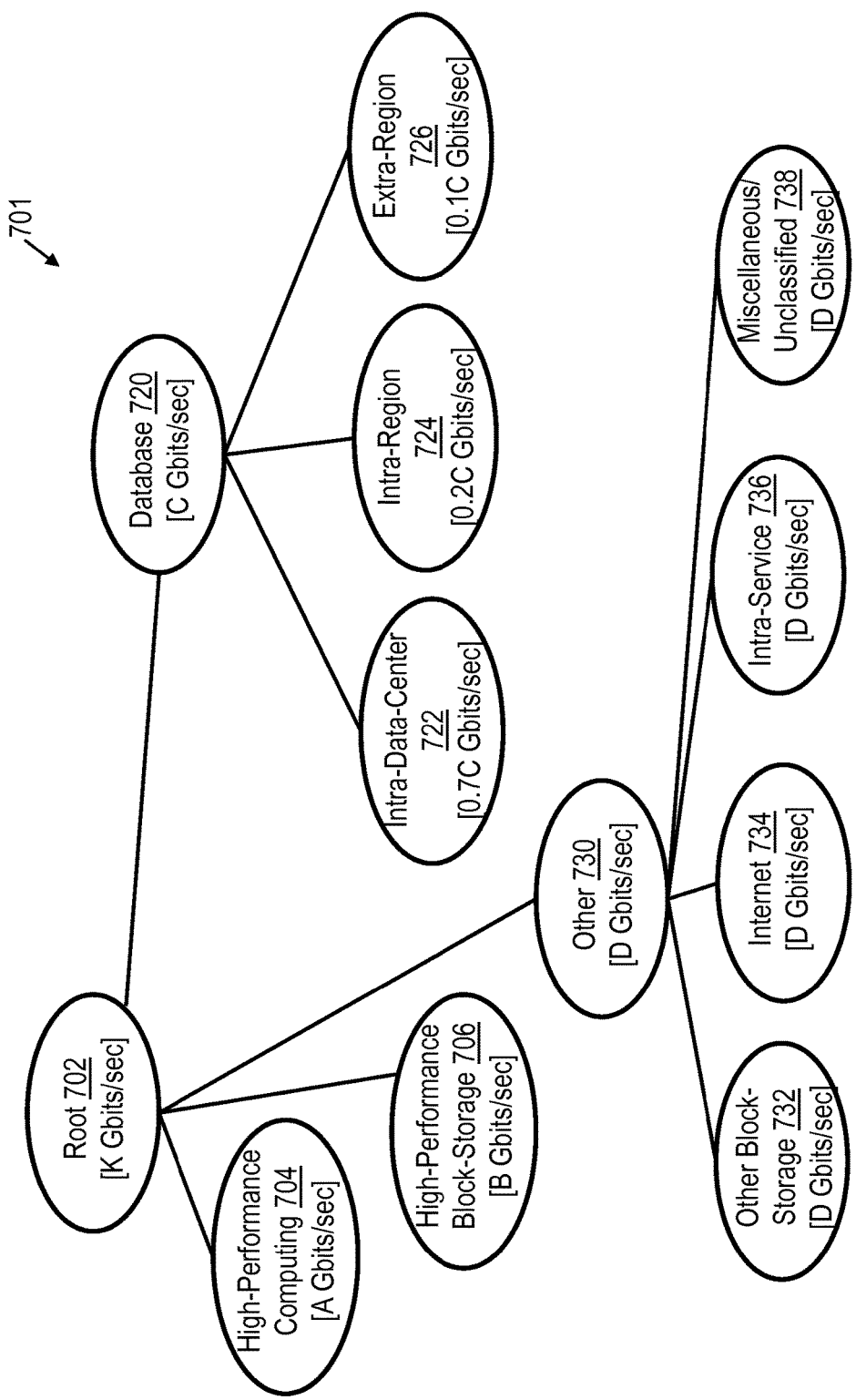
FIG. 7 shows an example of a classification tree data structure that may be used to represent network traffic categories for networking configuration at a device of a distributed system, in accordance with various embodiments.

FIG. 7 shows an example of a classification tree data structure 701 that may be used to represent network traffic categories for networking configuration at a device of a distributed system, according to at least some embodiments. Each node of the tree 701 may have an associated set of networking configuration options or settings, such as the respective bandwidth limit illustrated for each node in FIG. 7, for the category represented by the node. Other examples of networking configuration options that may apply to each node may include packet latency requirements or goals, other quality-of-service goals such as relative prioritization of different traffic categories, packet fragmentation/reassembly settings, or configuration settings dependent upon packet size. Traffic categories may be defined based on differences in a variety of properties in different embodiments—e.g., based on the category of application associated with the traffic, the services whose components are at the sending or receiving end, the network addresses of the endpoints involved (which may themselves be indicative of application type in some cases), the sizes of the transfers, the clients on whose behalf the traffic is generated, the locations of the endpoints relative to each other (e.g., whether, for an outgoing packet from a provider network node, the destination is within the local data center, the local availability container, the local region, another region of the provider network, or external to the provider network) and so on. In the illustrated classification tree 701, for example, node 704 represents traffic for one class of applications (high performance computing), node 720 represents database traffic, and node 706 represents high-performance block storage traffic (i.e., traffic associated with block storage devices that are configured to support high input/output rates). Within the database category represented by node 520, three nodes for location-based sub-categories are defined: node 722 for intra-data-center traffic, node 724 for intra-region traffic, and node 726 for extra-region traffic.

In embodiments in which the networking configuration options defined for various categories include bandwidth limits, traffic summation policies or rules of various kinds may apply to the classification tree, governing the relationships between the bandwidth limits of child nodes relative to parent nodes. In the illustrated example, the following rules may apply: (a) no child node in the tree may have a bandwidth limit exceeding the bandwidth limit of its parent, and (b) although the sum of the bandwidth limits of the children nodes of a parent node may exceed the bandwidth limit of the parent, during any given time period the sum of the actual traffic rates for the categories represented by the children nodes may not exceed the bandwidth limit of the parent.

In accordance with these rules, since the root node 702 (collectively representing all the traffic categories defined for the instance host or network device for which the classification graph is generated) has a bandwidth limit of K Mbit/sec, none of the children nodes of the root node may have a greater bandwidth limit than K Mbit/sec; thus, A<K, B<K, C<K, and D<K. In the case of node 720, the bandwidth limits of the children nodes (nodes 722, 725 and 726) have been assigned to sum up to the bandwidth limit of the parent node, and so both rules stated above are satisfied. In the case of node 730, representing a generic "other" traffic category with a bandwidth limit of D Gbit/sec, the child nodes 732 (other block-storage traffic), 734 (Internet traffic), 736 (Intra-service traffic) and 738 (miscellaneous or unclassified traffic that is not represented by any other leaf node) each also have a bandwidth limit of D Mbit/sec. Such a scenario, in which the sum of the nominal bandwidth limits for children nodes (4D Mbit/sec in this case) exceeds the bandwidth limit of the parent node (D Mbit/sec), may be interpreted as follows in accordance with the second rule listed above. Even though in principle each of the categories of the children nodes can have traffic rates of up to D Mbit/sec, in practice, during any given second (or other appropriate time unit), the sum of the actual traffic flows of all the child nodes is not to exceed D Mbit/sec. Thus, if the traffic rate for the category "other block-storage traffic" (node 732) is 0.6D Mbit/sec during a particular second, the traffic rates for nodes 734, 736 and 738 combined may not be allowed to exceed 0.4D.

Respective trees may be generated by NCS 180 for incoming and outgoing traffic at a given instance host or network device in some embodiments, and the tree for incoming traffic may differ from the tree for outgoing traffic in the networking configuration options and/or the categories. In some embodiments, for some or all nodes of a classification tree, different limits may be defined for sustained bandwidth (to be applied to average bandwidth usage over time periods exceeding T seconds, for example), and for burst bandwidth (e.g., a short term burst traffic rate of 4 Mbit/sec may be allowed for up to 2 seconds for a given instance host, even though the sustained bandwidth limit for that instance host is set to 1 Mbit/sec). As noted earlier, in some implementations, the traffic classification hierarchy for a given instance host, network device or storage device may be flat instead of comprising multiple layers.

Figure 8:
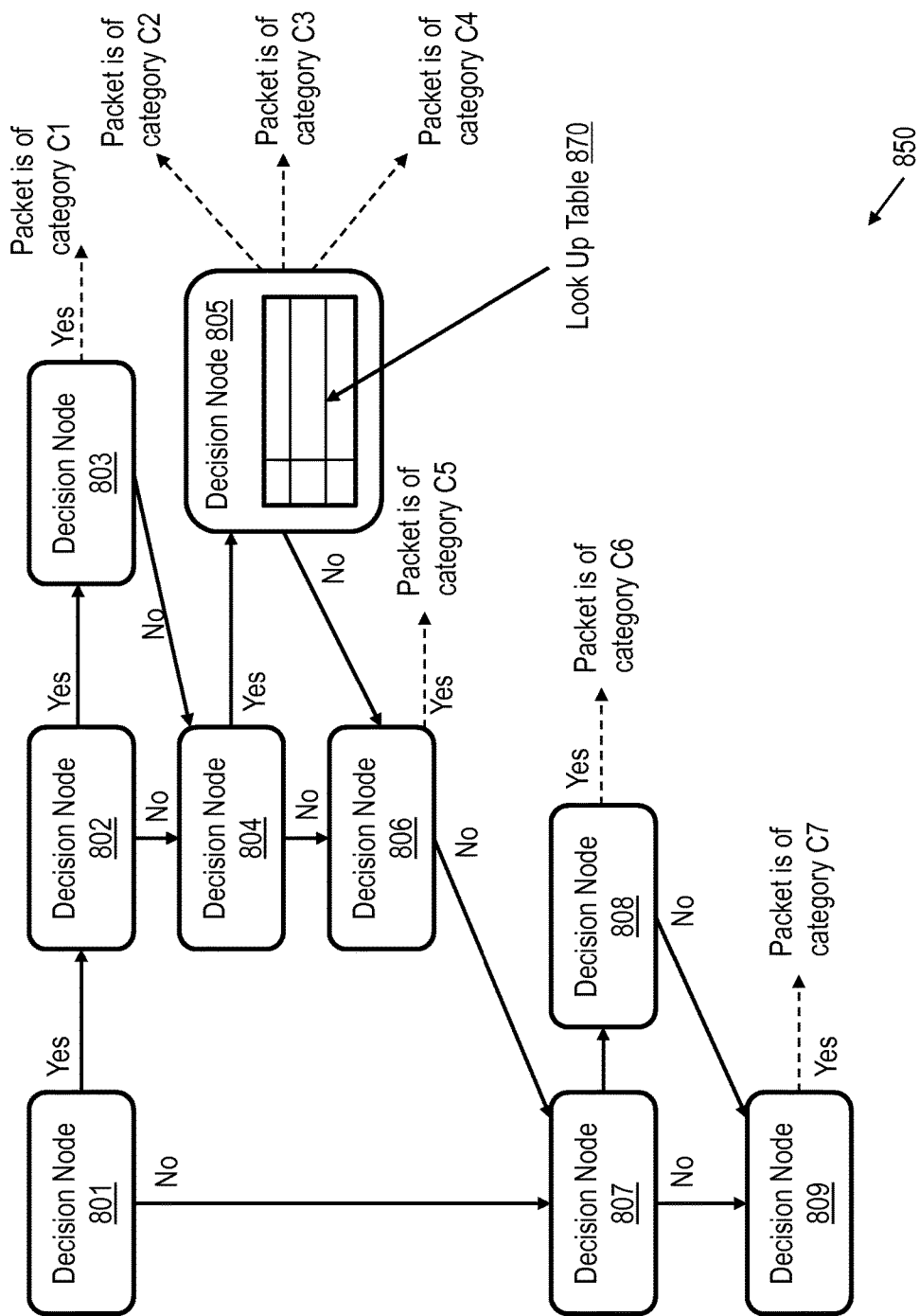
FIG. 8 shows an example of a traffic classification procedure graph that may be used together with a classification tree to determine the category of a unit of network traffic, in accordance with various embodiments.

In at least some embodiments a networking configuration server may determine the steps or rules of a procedure that can be used to classify network traffic units such as packets into the categories defined for a given instance host or network device. FIG. 8 shows an example of a traffic procedure graph 850 that may be used together with a classification tree to determine the category of a unit of network traffic, according to at least some embodiments. Such a graph 850 may comprise a plurality of decision nodes in each of which a respective set of classification criteria for network traffic are indicated. In at least some embodiments, at least a subset of the decision nodes may be arranged in a sequence in which successive nodes of the sequence correspond to successively narrower categories. For example, in the sequence of nodes 801, 802 and 803, a subset of traffic that matches criteria indicated in node 801 may match the criteria indicated in node 802, and a subset of traffic that matches criteria indicated in node 802 may match criteria indicated in node 803. If a given unit of network traffic ends up not matching the criterion of the last node of the sequence, that traffic unit may have to be evaluated using a different sequence—e.g., if a packet does match the criteria of nodes 801 and 802 (as indicated by "yes" results with respect to nodes 801 and 802) but does not match the criteria indicated in node 803 (as indicated by a "no" result with respect to node 803), the packet may then have to be evaluated using the sequence of nodes 804 and 805.

In general, if a given traffic unit matches all the criteria of a given sequence of nodes, its category may be determined—e.g., it may be classified as a category C1 packet if the criteria of nodes 801, 802 and 803 are met, as a category C6 packet if the criteria of nodes 807 and 808 are met, as a category C5 packet if the criteria of node 806 are met, or as a category C7 packet if the criteria of node 809 are met. The criteria indicated in a given node may be expressed in terms of various properties of the network traffic unit in different embodiments. For example, the contents of one or more headers of a packet, such as the source or destination IP address, port numbers, or the networking protocol being used may be used to determine its category, or contents of the body may be used. Each of the categories into which a given traffic unit may be classified using the procedure may correspond to a corresponding node of a classification tree also generated by the NCS 180 in an embodiment.

At least in principle, arbitrarily fine-grained criteria may be used for packet classification in at least some embodiments, and arbitrarily long sequences of decision nodes may be generated. For example, the classification criteria may be based on very specific contents of the packet bodies (e.g., whether a particular byte range "0xff" occurs at offset O1 of a packet), or on arbitrary combinations of packet or header contents, and so on. In order to reduce the size and complexity of the classification procedure graphs 850, decision nodes with multiple possible outcomes may be used in some embodiments. For example, in procedure graph 850, node 805 comprising lookup table 670 is included. Each such lookup table may comprise a plurality of rows from which one may be indexed or selected on the basis of a property of a given traffic unit (such as a packet's destination IP address) to arrive at a classification decision. In the example of node 805, the classification decision is whether the packet belongs to category C2, C3 or C4. In other cases, the classification decision may be to evaluate the packet using an additional sequence of decision nodes—e.g., the lookup table entries may serve as pointers to other classification graphs or sub-graphs.

Figure 9:
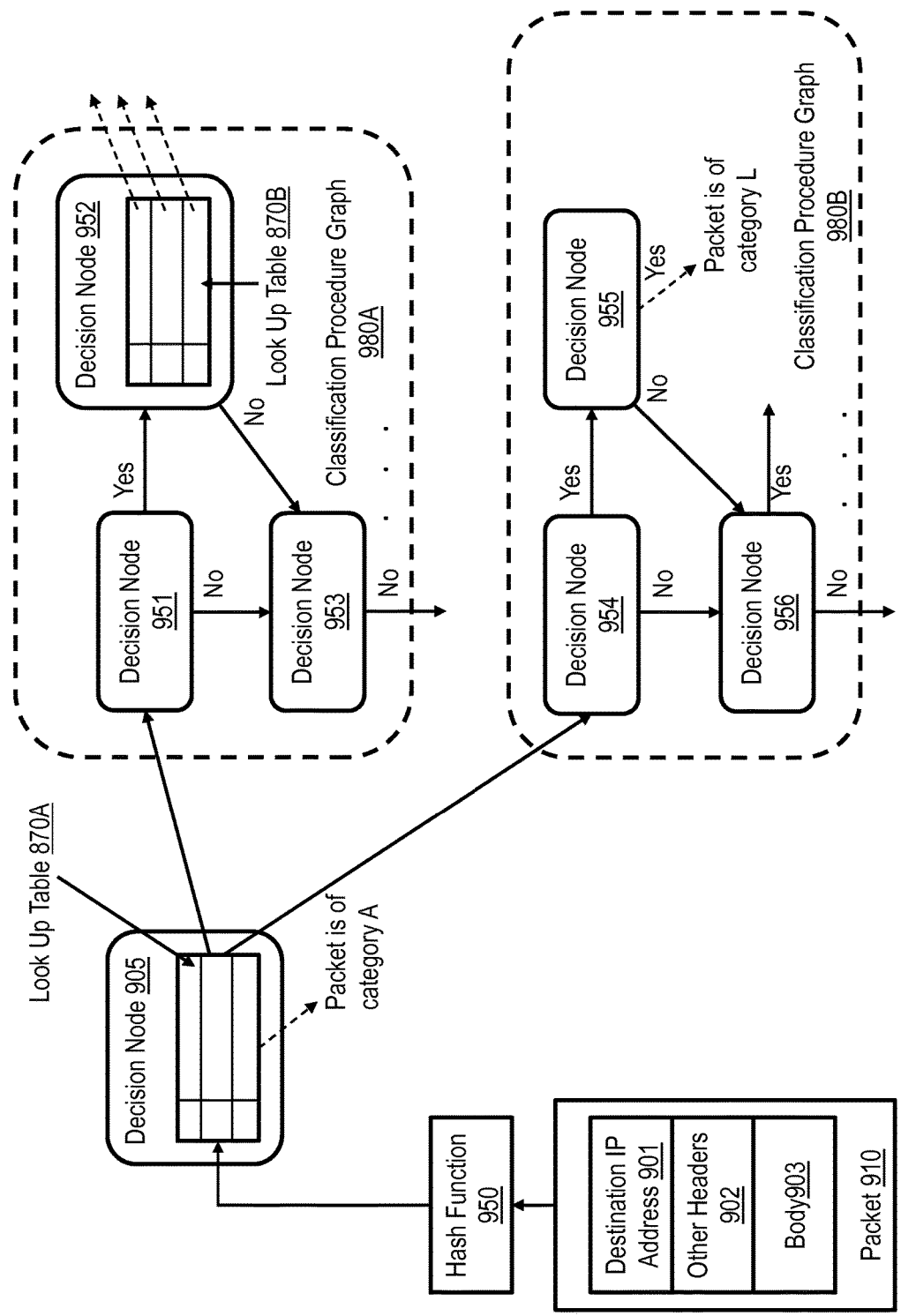
FIG. 9 shows an example use of a lookup-table node of a traffic classification procedure graph, in accordance with various embodiments.

FIG. 9 shows an example of a use of a lookup-table node 905 of a traffic classification procedure graph, according to at least some embodiments. In the depicted embodiment, a hash function 950 may be applied to a portion of a network packet 910 to identify the entry of the lookup table 870A of node 905 that is to be used to categorize the packet. The lookup table node 905 may itself have been reached after an evaluation of other decision nodes of the procedure in some cases, i.e., at least some level of categorization may already have been made for packet 910 prior to the application of the hash function 950. The packet in the depicted example is an outbound packet with a destination IP address "P.Q.R.S" 901, and the third element "R" of the four elements of the destination IP address is used as an input to the hash function 950 to determine the lookup table entry corresponding to the packet 910. Any of several properties of a packet 910 may be used as input to such a hash function in various embodiments, including for example values of other parts of the destination IP address or the source IP address, values of other header fields 902, or even contents of the body 903 of the packet. Rules regarding which properties of the packets are to be used to select lookup table entries, and the function (such as hash function 950) to be applied to the properties, may be provided together with the classification metadata by a NCS 180 to a control module at a target device such as an instance host or a network device in some embodiments.

In some cases, a lookup table entry that is selected (e.g., as a result of the hashing of the destination IP address element) may directly indicate a traffic category of the corresponding packet. For example, a selection of one of the elements of the lookup table 870A leads to the category A in FIG. 9. Other entries of the lookup table may themselves serve as pointers to additional procedure graphs, such as graphs 980A and 980B of FIG. 9, whose decision nodes may have to be navigated in order to determine the category of the packet 910. Such additional procedure graphs that are reached as a result of criteria evaluated from a node of a different graph may also be referred to as sub-graphs herein. In the depicted example, criteria indicated by decision nodes 951, 952 (itself a node comprising a lookup table 870B), and/or 953 may need to be evaluated if the hash function 950 leads to one entry of 870A, while criteria indicated by decision nodes 954, 955 and/or 956 may have to be evaluated if the hash function 950 results in a selection of a different entry of lookup table 870A. If procedure graph 980B is reached, and the criteria indicated in elements 954 and 955 are met, for example, the packet 910 may be deemed to belong to traffic category L in the example of FIG. 9. The incorporation of lookup tables 870 into various nodes of classification procedure graphs 850 may allow fairly compact representations of traffic classification logic, even when complex fine-grained logic is used for the classification.

Figure 10:
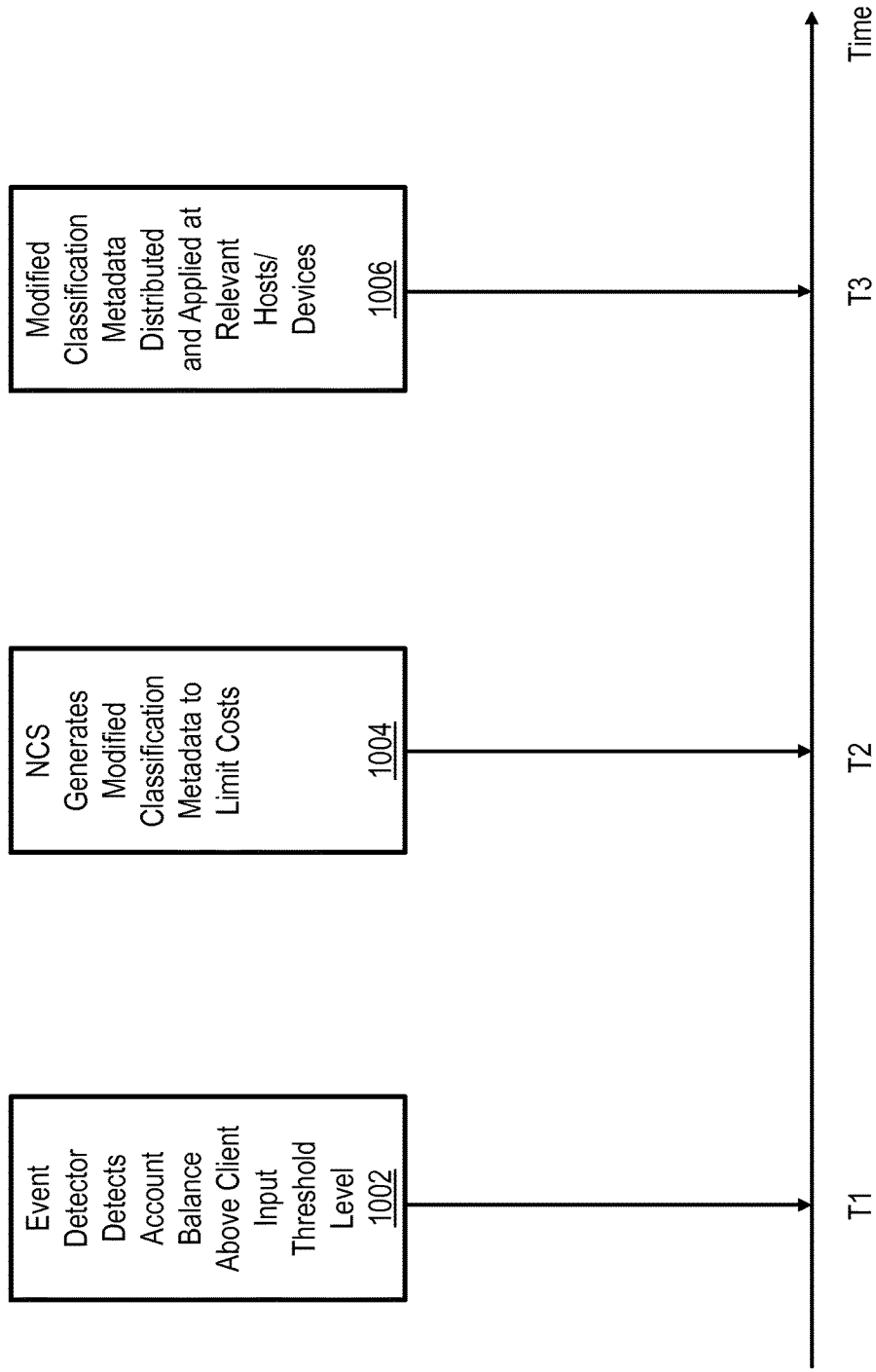
FIG. 10 shows an example responsiveness metric that may be utilized to determine values for one or more parameters of a networking configuration service, in accordance with various embodiments.

An example timeline is shown in FIG. 10, in which the time value increases from the left to right. At time T1, as indicated by block 1002, an event detector detects, which may reside in NCS 180 detects that the current cycle account balance, or account balance for any period of time, has exceeded a threshold amount that the client had disclosed in the client input throttling instructions. In alternative embodiments, at time T1, the event detector may detect that the amount of data transferred during the current billing cycle, or any specified period of time, has exceeded a threshold amount that the client has disclosed in the client input throttling instructions. The determination may be made by, for example, comparing the threshold amount indicated in the client input throttling instructions to the current cycle account balance or data transferred.

The networking configuration system may be configured to respond to a determination that the threshold amount has been exceed, e.g., by generating new classification metadata and/or new configuration options such as bandwidth limits for the appropriate nodes, as indicated by the client input throttling instructions, of the distributed system, and applying the new metadata as quickly as possible. As indicated by block 1004, modified metadata for a set of nodes may be generated at time T2 in the depicted timeline. For example, if the client input throttling instructions specify that a specific category of traffic, e.g., all traffic from a specific instance, the NCSs 180 responsible for applying bandwidth limits for those instances may generate the new metadata. The new metadata may, for example, simply impose new bandwidth limits (at least temporarily) on all traffic emanating from the particular instance.

The modified classification metadata may be distributed to the appropriate instance hosts or other nodes, and may be put into effect at time T3 in the example timeline of FIG. 10, as indicated by block 1006. The responsiveness of the networking configuration service to such triggering events, as indicated for example by the interval (T3−T1), may be tracked over time, e.g., by the networking configuration service manager 222, and may be used to adjust the number of NCSs 180 employed, or various properties of the metadata distribution system.

Figure 11:
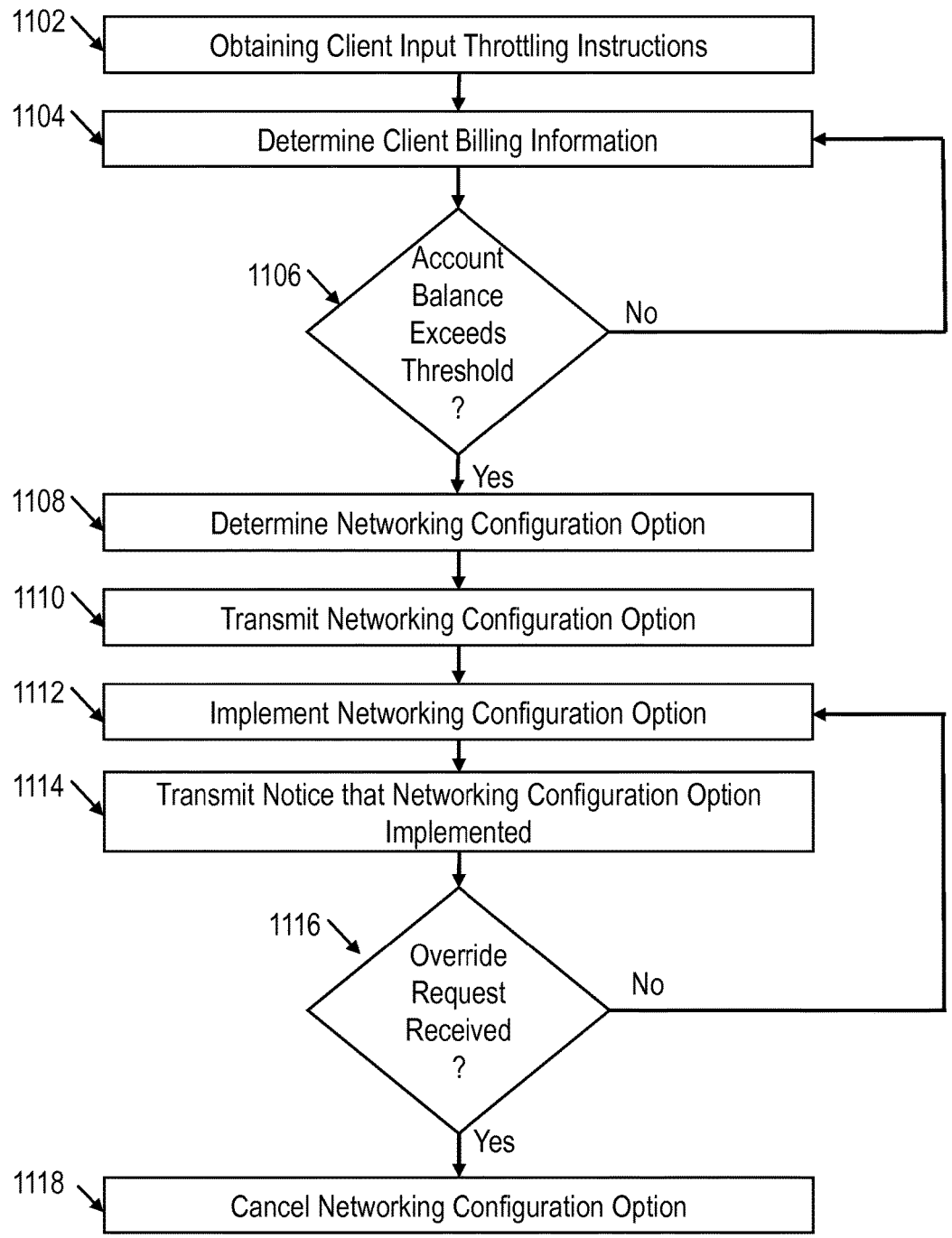
FIG. 11 shows a flow diagram illustrating aspects of operations that may be performed to change networking management parameters in response to a client directed throttling request, in accordance with various embodiments.

FIG. 11 is a flow diagram illustrating aspects of operations that may be performed to change networking management parameters in response to a client directed throttling request, in accordance with some embodiments. As shown in element 1102, client input throttling instructions are obtained from a client by a billing node. Client input throttling instructions may include a threshold amount or level of a current billing cycle at which bandwidth is to be reduced. In element 1104, the billing node determines client billing information. Client billing information may include a client's accrued account balance during the current billing cycle.

In element 1106, a determination is made, by a NCS, whether the current accrued account balance exceeds the threshold contained in the client input throttling instructions. If, in element 1106, a determination is made that the current accrued account balance does not exceed the threshold contained in the client input throttling instructions, then the method reverts to element 1104 with the continued determination of client billing information by the billing node. However, if, in element 1106, a determination is made that the current accrued account balance does exceed the threshold contained in the client input throttling instructions, then, in element 1108, a determination is made by a NCS as to what constitutes the networking configuration option. In some embodiments, the networking configuration option includes instructions as to how to limit bandwidth for a client's particular instances once the threshold amount has been exceeded during any billing cycle. For example, the networking configuration option may indicate data transfer reduction limits for traffic categories: (a) receiving packets of data, (b) transmitting packets of data, (c) geographical transfer or reception, and/or (d) type of service data transmitted or received.

In element 1110, the networking configuration option is transmitted by a NCS to a particular node in provider network. This transfer may be in the form of metadata that directs the receiving node through the classification of particular traffic. In element 1114, the networking configuration option is implemented at the node. After implementing the networking configuration option, in element 1114, a notice that the networking configuration option is transmitted to the client. Thus, the client is informed that throttling of data transmissions for the client's instances is taking place. If the client wishes to override the networking configuration option, then the client may transmit an override request to a NCS. Therefore, in element 1116, a NCS determines whether it has received an override request. If, in element 1116, the NCS determines that it has not received an override request, then the method reverts to element 1112 with continuing to implement the networking configuration option. However, if, in element 1116, the NCS determines that it has received an override request from the client, then, in element 1118, the networking configuration option is cancelled by the NCS. In some embodiments, the networking configuration is cancelled through the dispersal, by the NCS, of metadata that directs the receiving nodes through the classification of particular traffic.

Figure 12:
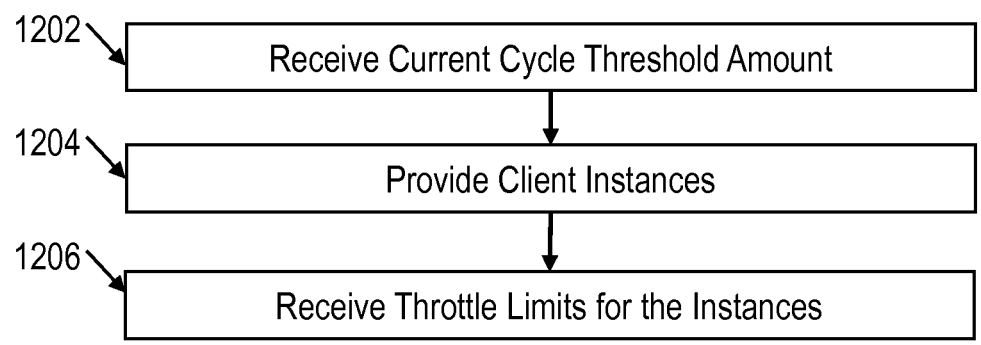
FIG. 12 shows a flow diagram illustrating aspects of obtaining client input throttling instructions by the billing node, in accordance with various embodiments.

FIG. 12 is a flow diagram illustrating aspects of obtaining client input throttling instructions by the billing node, in accordance with some embodiments. In element 1202, a current cycle threshold account balance is received as a part of the client input throttling instructions. The threshold amount may comprise an account balance, that should it be exceeded, the client requires bandwidth limits on data transfers for its instances provided by the provider network. In element 1204, some of or all of the client's instances that are executed on the provider network are provided to the client. A user of the client, then may select the networking configuration option for each of the displayed instances. In element 1206, throttle limits, i.e., bandwidth limits, for at least one of the provided instances should the current cycle threshold account balance be exceeded, is received by the billing node. The client input throttling instructions then may be obtained by a NCS.

Figure 13:
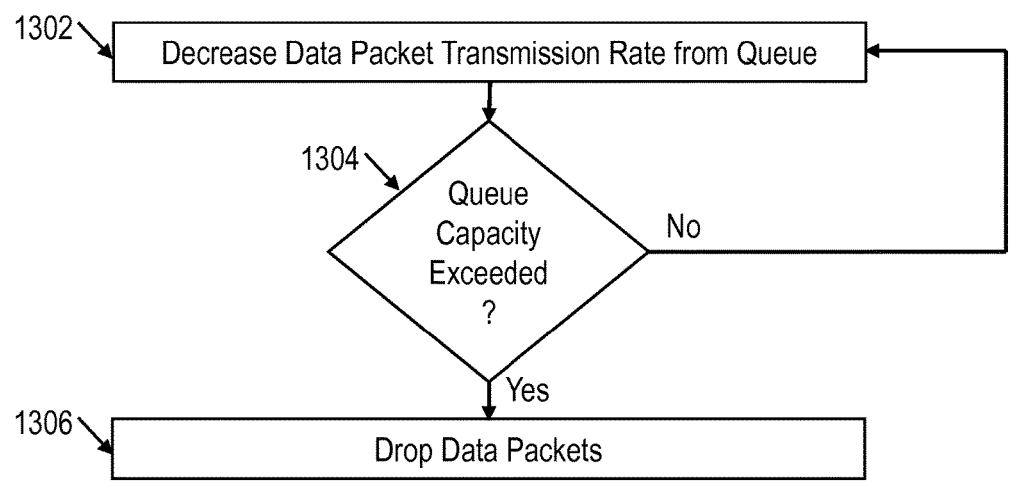
FIG. 13 shows a flow diagram illustrating aspects of implementing the networking configuration option, in accordance with various embodiments.

FIG. 13 is a flow diagram illustrating aspects of implementing the networking configuration option, in accordance with some embodiments. More specifically, FIG. 13 illustrates an example of reducing data transfers for a particular instance, in accordance with some embodiments. In element 1302, data packet transmission rate for data stored in a queue is decreased. In element 1304, a determination is made as to whether the queue is at its storage capacity. If the queue has exceeded its storage capacity, then, in element 1306, data packets are dropped from the queue. However, if, in element 1304, a determination is made that the queue has not exceeded its storage capacity, then the method continues with element 1302 continue with the data packet transmission decrease from the queue.

Figure 14:
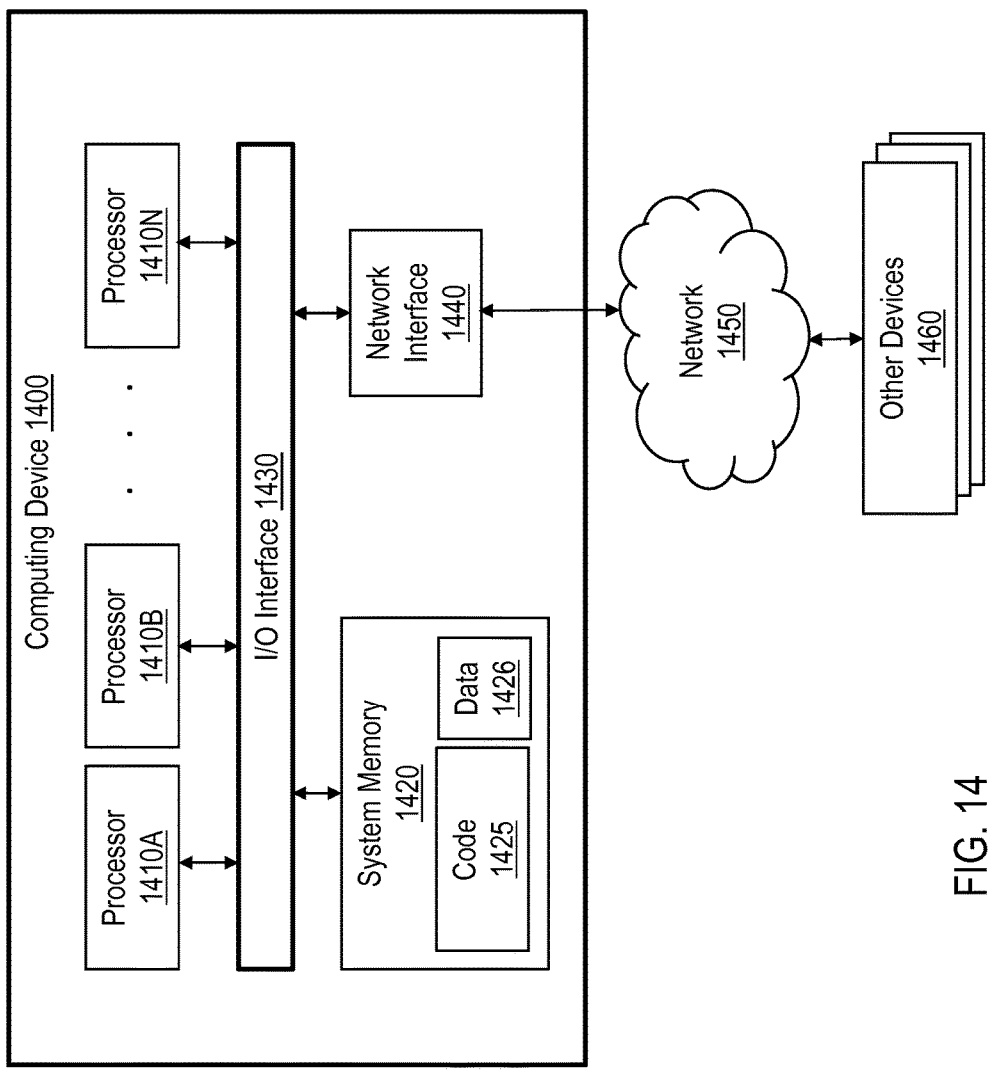
FIG. 14 shows a block diagram illustrating an example computing device, in accordance with various embodiments.

In at least some embodiments, a server that implements a portion or all of one or more of the technologies described herein, including the techniques to implement the networking configuration servers, networking configuration service managers, billing node, and/or instance hosts, may include a general-purpose computer system that includes or is configured to access one or more computer-accessible media. FIG. 14 shows such a general-purpose computing device 1400. In the illustrated embodiment, computing device 1200 includes one or more processors 1410 coupled to a system memory 1420 via an input/output (I/O) interface 1430. Computing device 1200 further includes a network interface 1440 coupled to I/O interface 1430.

In various embodiments, computing device 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. In some implementations, graphics processing units (GPUs) may be used instead of, or in addition to, conventional processors.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1420 as code 1425 and data 1426

In one embodiment, I/O interface 1430 may be configured to coordinate I/O traffic between processor 1410, system memory 1420, and any peripheral devices in the device, including network interface 1440 or other peripheral interfaces such as various types of persistent and/or volatile storage devices used to store physical replicas of data object partitions. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other devices 1460 attached to a network or networks 1250, such as other computer systems or devices as illustrated in FIG. 1 through FIG. 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1400 via I/O interface 1430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing instructions that when executed on a computing system cause the computing system to:
   obtain, at a centralized server of a networking configuration service, client input throttling instructions and a current cycle client account balance;
   determine, at the networking configuration service, based on the current cycle client account balance exceeding a threshold amount disclosed in the client input throttling instructions, to apply a networking configuration option disclosed in the client input throttling instructions to a category of network traffic specified by the client input throttling instructions and associated with a virtual machine instance of a of the client, wherein the virtual machine instance runs on a node of a set of nodes configured to implement a network-accessible service of a service provider network;
   transmit, to a control module running on the node, based on the determination, metadata used to apply the networking configuration option;
   configure, at the node, a packet queue for each category of network traffic specified in the network configuration option;
   categorize, at the node, each packet of network traffic directed to the virtual machine instance in accordance with categories of network traffic specified in the network configuration option;
   store each packet of the network traffic in one of the packet queues in accordance with the category of the packet; and
   reduce a rate of network traffic to the virtual machine instance by throttling a transfer rate of each packet queue in accordance with a transfer rate specified in the network configuration option for the category of network traffic stored in the packet queue.

2. The computer-readable medium of claim 1, wherein the networking configuration option specifies a reduction of a data transmission rate from the node.

3. The computer-readable medium of claim 2, wherein the data transmission rate comprises a rate at which a plurality of data packets is transmitted from a queue in which the plurality of data packets is stored.

4. A system comprising:
   a plurality of computing devices implementing a networking configuration server and a plurality of nodes of a service provider network, each of the plurality of computing devices comprising a processor and memory coupled to the processor, wherein the computing devices are configured to:
   obtain, at the networking configuration server, client input throttling instructions and client billing information;
   determine, at the networking configuration server, based on the client input throttling instruction and client billing information, to apply a networking configuration option provided by the client input throttling instructions to a particular category of network traffic associated with a virtual machine instance of the client, wherein the virtual machine instance runs on a node of a set of nodes configured to implement a network-accessible service of the service provider network;
   transmit, from the networking configuration server to the node, the networking configuration option;
   configure, at the node, a packet queue for each category of network traffic specified in the network configuration option;
   categorize, at the node, each packet of network traffic directed to the virtual machine instance in accordance with categories of network traffic specified in the network configuration option;
   store each packet of the network traffic in one of the packet queues in accordance with the category of the packet; and
   reduce a rate of network traffic to the virtual machine instance by throttling a transfer rate of each packet queue in accordance with a transfer rate specified in the network configuration option for the category of network traffic stored in the packet queue.

5. The system of claim 4, wherein the client billing information comprises a current cycle account balance.

6. The system of claim 5, wherein the determination to apply the networking configuration option is further based on the current cycle account balance exceeding a threshold amount provided by the client input throttling instructions.

7. The system of claim 4, wherein the networking configuration option specifies a reduction of a data transmission rate from the node.

8. The system of claim 7, wherein the data transmission rate comprises a rate at which a plurality of data packets is transmitted from a queue in which the plurality of data packets is stored.

9. The system of claim 8, wherein, the plurality of computing devices are further configured to, based on the plurality of data packets exceeding a size limitation of the queue, drop one or more of the plurality of data packets.

10. The system of claim 4, wherein the networking configuration option comprises specifies a reduction of a data transmission rate into the node for each of a plurality of different network traffic categories.

11. The system of claim 4, wherein:
the plurality of computing devices further implements a billing node, and
the network configuration server is configured to obtain the client input throttling instructions and client billing information from the billing node.

12. The system of claim 11, wherein the billing node is configured to obtain, from a client, the client input throttling instructions.

13. The system of claim 4, wherein the plurality of computing devices are further configured to, based on the determination to apply the networking configuration option, transmit a notice that the networking configuration option is to be implemented to a client.

14. The system of claim 4, wherein the plurality of computing devices are further configured to:
obtain, at the networking configuration server, a client override request;
based on obtaining the client override request, transmit, from the networking configuration server to the node of the provider network, the client override request; and
cancel, at the node, the networking configuration option.

15. A method, comprising:
obtaining, by a first computing device, client input throttling instructions;
determining client billing information;
determining, in accordance with the client input throttling instructions and based on the client billing information, a networking configuration option for a particular category of network traffic associated with a second computing device;
transmitting, to the second computing device from a networking configuration server, the networking configuration option;
configuring, at the second computing device, a packet queue for each category of network traffic specified in the network configuration option;
categorizing, at the second computing device, each packet of network traffic directed to a service instance associated with the second computing device in accordance with categories of network traffic specified in the network configuration option;
storing each packet of the network traffic in one of the packet queues in accordance with the category of the packet; and
reducing a rate of network traffic to the service instance by throttling a transfer rate of each packet queue in accordance with a transfer rate specified in the network configuration option for the category of network traffic stored in the packet queue.

16. The method of claim 15, further comprising, transmitting a notice that the networking configuration option has been implemented to a client.

17. The method of claim 16, further comprising, canceling, at the second computing device, the networking configuration option based on an override request.

18. The method of claim 15, further comprising, determining that the client billing information comprises a current cycle account balance that exceeds a threshold amount disclosed in the client input throttling instructions.

19. The method of claim 15, wherein the obtaining client input throttling instructions comprises:
receiving, from a client, a current cycle threshold amount;
listing a plurality of service instances to which the client has access; and
receiving, from the client, throttle limits for at least one of the plurality of service instances.

20. The method of claim 19, wherein the throttle limits include: (a) limits for receiving packets of data, (b) limits for transmitting packets of data, (c) limits as to which geographic region data is transmitted, or (d) limits as to what type of service data is transmitted.

21. The method of claim 15, further comprising, decreasing, at the second computing device, a rate at which a plurality of data packets is transmitted from a queue in which the plurality of data packets is stored.

22. The method of claim 21, further comprising, dropping, based on the plurality of data packets exceeding a size limitation of the queue, one or more of the plurality of data packets.

* * * * *